Aug. 13, 1957  C. J. LUCIA  2,802,547
SHAFT LUBRICATION ARRANGEMENT
Filed March 3, 1954  2 Sheets-Sheet 1
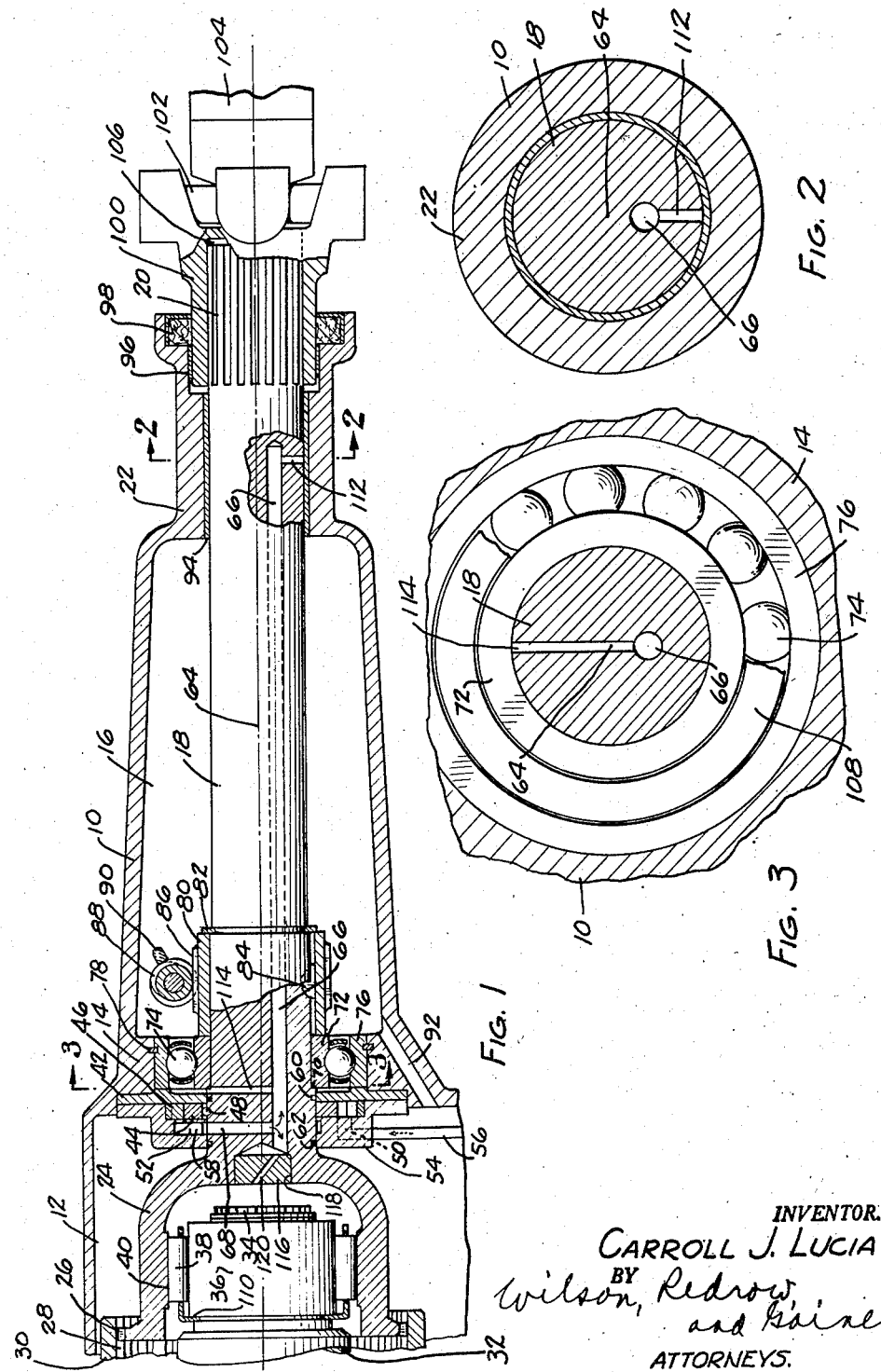
INVENTOR.
CARROLL J. LUCIA
BY Wilson, Redrow,
and Gaines
ATTORNEYS.

Aug. 13, 1957 — C. J. LUCIA — 2,802,547
SHAFT LUBRICATION ARRANGEMENT
Filed March 3, 1954 — 2 Sheets-Sheet 2
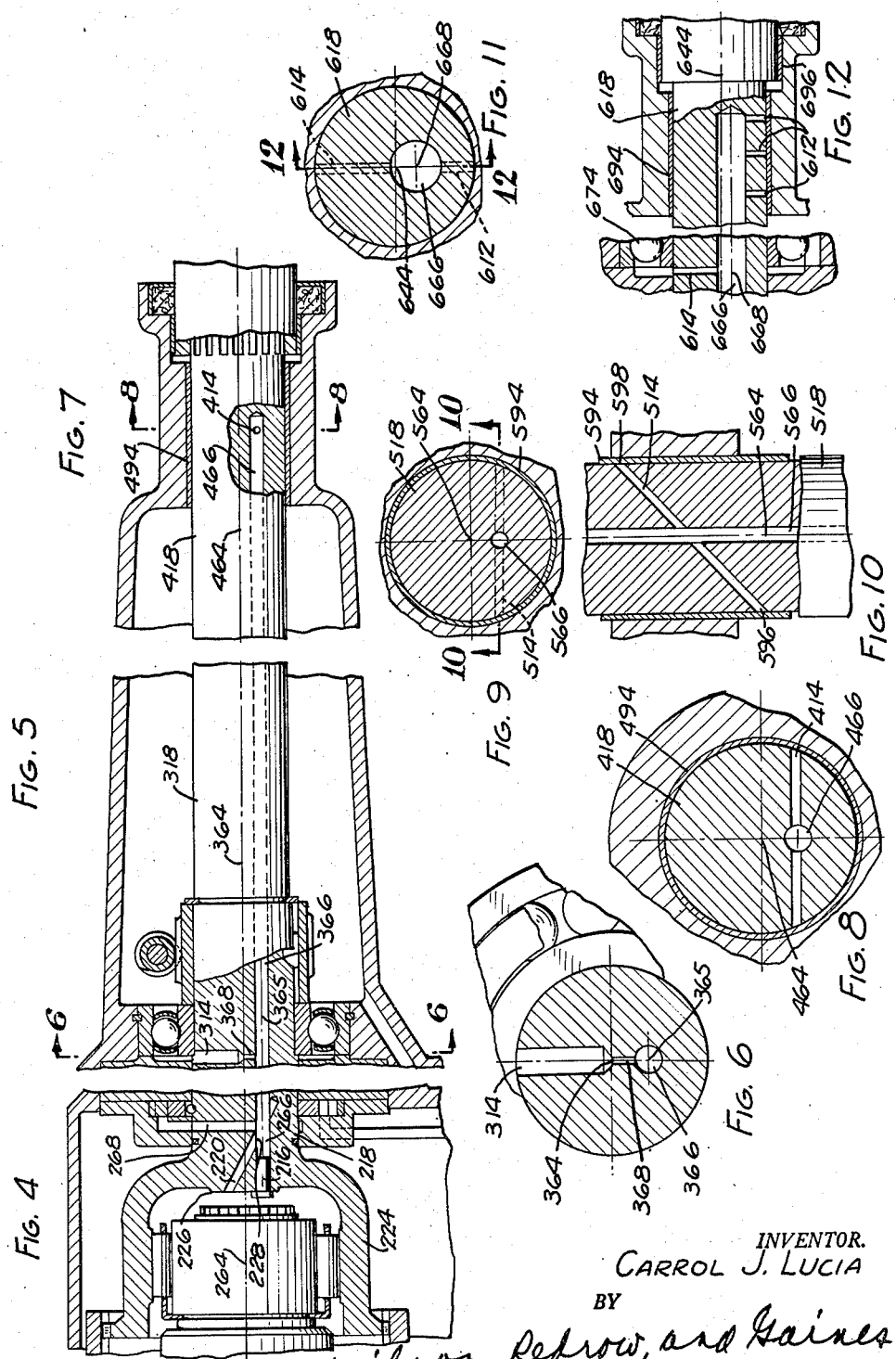
INVENTOR.
CARROL J. LUCIA
BY
Wilson, Redrow, and Gaines
ATTORNEYS United States Patent Office 2,802,547
Patented Aug. 13, 1957

2,802,547

SHAFT LUBRICATION ARRANGEMENT

Carroll J. Lucia, Birmingham, Mich., assignor to Studebaker-Packard Corporation, a corporation of Michigan Application March 3, 1954, Serial No. 413,928

28 Claims. (Cl. 184—6)

The present application relates to a shaft lubrication arrangement, particularly an internal passage arrangement for discriminately lubricating various portions of a rotatable shaft which contains the passages and which has in association with each such portion of the shaft, a set of friction or anti-friction elements or similarly employed bearing, clutch or brake devices.

In the use of rotatable shafting which employs bearings of different constructions along its length or else one or more bearings in conjunction with other devices which differ therefrom in function and structure, it frequently becomes necessary to lubricate the bearings and/or the other devices from a common lubricant supply passage from which a disproportionate amount of lubricant may tend to be diverted into one or more of the bearings or devices at the sacrifice of possibly starving the remaining ones of the necessary lubricant and creating a situation wherein the latter may be found to run dry or nearly so. Such a situation, of course, is unwanted and unless remedied will be attended by faulty operation which may lead ultimately to a parts failure. One known remedy is to provide restrictions or orifices or a close fit to the parts adjacent the greedier ones of the bearings or devices to stop undue consumption of the available lubricant by the latter, but undue drops in pressure, calibration problems, plugged connections and other objections have been found to result from too great or too extensive a use of such a remedial measure. A primary object of the invention herein presented is the provision of a shaft lubrication arrangement which overcomes the foregoing disadvantages and at the same time inherently produces the discriminate proportioning of the lubricant flow to the extent desired.

According to one feature of the instant shaft lubrication invention, an eccentrically drilled longitudinally disposed lubricant distribution passage is formed in a rotatable shaft in association with branch lubricating passages fed thereby which are so connected at different locations to the distribution passage that the shaft-produced centrifugal forces effective on the distribution passage tend inherently to impede lubricant flow in certain of the branches and accentuate the flow in other branches.

An object of the invention in line with the preceding feature is to provide, in an eccentrically drilled lubricant containing rotatable shaft, a set of axially spaced apart branch lubrication passages therein which are connected to the drilled eccentric conduit at differing radial distances from the axis of shaft rotation and which may in fact be diametrically opposite to one another with respect to the opposite walls of the eccentric conduit thereby creating a situation wherein the centrifugal forces due to shaft rotation act in opposition to fluid flow in the branch lubricating passage or passages on the axis side of the conduit and in direct aid of fluid flow in the opposite branch or branches.

A further object of the invention is to provide an arrangement of spaced apart lubricated devices through which the rotational axis of a rotatable shaft passes and of which rows of circumferentially spaced anti-friction and/or friction engaging elements included therein provide open spaces for the free passage of lubricant through certain of the devices and of which one or more sleeves included in others have little lubricant passage clearance, wherein an eccentrically drilled distribution conduit in the shaft has a direct relatively short transverse branch for leading lubricant strictly radially outwardly to the low clearance sleeves and has an oppositely extending straight branch leading radially inwardly and then outwardly to the open type lubricated devices.

Another object is to provide, in an eccentrically drilled shaft having branches for leading lubricant at differing angular directions outwardly from the eccentrically drilled conduit, an antisiphon orifice in each of the one or more branches passing generally across the central portion of the shaft cross section from the conduit whereas the other branches may be of uniform cross section throughout, the orifice or orifices being an added precaution against the creation of a self-perpetuating siphoning effect in the eventuality that the passages leading generally across the central portion of the shaft cross section become fully charged with fluid under certain circumstances occurring during some phases of shaft rotation.

Further features, objects and advantages will either become apparent or be specifically pointed out when, for a better understanding of the invention, reference is made to the following written description taken in conjunction with the accompanying drawings in which:

Figure 1 is a longitudinal sectional view in elevation showing an internally passaged shaft arrangement for lubricating a one-way clutch, a ball bearing, and a sleeve bearing;

Figures 2 and 3 are transverse sectional views taken along the lines 2—2 and 3—3 of Figure 1;

Figure 4 shows a modified form of clutch lubrication arrangement in longitudinal section;

Figure 5 and Figure 6 are respectively longitudinal and cross sectional views of a modified form of ball bearing lubrication arrangement;

Figures 7 and 8 are longitudinal sectional and cross sectional views of a modified form of sleeve bearing lubrication arrangement;

Figures 9 and 10 are cross sectional and longitudinal plan views showing a further modification of sleeve bearing lubrication arrangement; and Figures 11 and 12 are cross sectional and longitudinal elevation views showing a modified form of sleeve bearing and ball bearing lubrication arrangement.

Illustrative of one environment to which the present invention may be applied, the Figures 1, 2 and 3 show a tail shaft case 10 for the output end of a set of planetary gearing, for instance planetary gearing of the type used in overdrives for automobile vehicle transmissions. The tail shaft case 10 has a planetary-gear-receiving forward compartment 12 which is separated by means of an inwardly directed integral flange 14 from a main compartment 16 of tapering cross section within the case 10 in which a tail shaft 18 is set to rotate. The tail shaft 18 has an unsupported center section and opposite end portions for journaling supporting the same, one of the end portions carrying a set of splines 20 at the rear and passing through a rear closure portion 22 integral with but of reduced diameter with respect to the body of the case 10. The tail shaft 18 has an integral opposite end 24 of a general bell shape provided with a peripheral set of external teeth 26 received in a companion set of internal splines 28 which may serve in common as internal teeth on a ring gear 30 adapted to mesh with the external teeth on a set of planetary overdrive pinions, not shown.

An input shaft for the planetary gearing connected in conventional fashion to a planet pinion carrier 32 and passing through the hub of an independently rotatable planet engaging, reaction sun gear, not shown, has a set of external splines 34 by means of which the input shaft is made rotatably fast to the carrier 32. A reduced portion of the carrier 32 has a smooth external surface as at 36 about which a row of circumferentially spaced apart one-way clutch elements or sprags 38 is disposed so as to provide a one-way drive connection between the smooth external surface 36 on the carrier 32 and a smooth companion interior surface 40 formed on a radially upraised land within the bell shaped portion 24 of the tail shaft 18.

In the operation of the planetary gearing of Figure 1 the one-way clutch sprags 38 permit the tail shaft 18, when driven by the rear wheels of the vehicle, to overrun the carrier 32 at all times during which the planetary gearing is not locked up in 1:1 drive ratio. Thus a free wheeling action results insofar as the drive wheels of the vehicles are concerned but at other times at which the speed of the carrier 32 is equal to or tends to exceed the forward speed of the tail shaft 18 the one-way clutch sprags 38 automatically engage to enforce conjoint rotation as between the carrier 32 and the tail shaft 18. The enforced locking up of the planetry gearing in well known manner in 1:1 drive ratio provides for engine braking on coast and for towed starts when the engine is dead and is incapable of self-starting. The means for effecting the locked up condition of a planetary gearset, commonly termed an overdrive lockout operation, is fully shown and described in section VI, Transmission and Overdrive, Service Manual, Packard Motor Car Company, Detroit 32, Michigan. The one-way clutch sprags 38 further permit an overrunning action of the tail shaft 18 at all times of overdrive operation of the planetary gearset during which the reaction sun gear, not shown, is stationarily held against rotation and the pinions on the carrier 32 drive the ring gear 30 and the tail shaft 18 at a relatively higher forward speed than the speed at which the carrier 32 is being driven by the vehicle engine.

The inwardly directed flange 14 on the case 10 receives an abutting end plate 42 for a rotary gear type fluid pump having a pair of eccentrically mounted inner and outer rotors 44, 46 of which the inner rotor 44 has a two-way drive ball connection as at 48 to the tail shaft 18 so as to be driven thereby. The inner and outer rotors 44, 46 are formed with teeth which are so proportioned as to differ by one in number and which in known manner cooperate to trap lubricating fluid and transfer the same under pressure from an inlet port 50 to a discharge port 52 formed in a closure member 54 at the opposite side of the pump from the end member 42. Both of the members 42, 54 at the sides of the pump are bolted to the stationary flange 14 as by a set of fasteners, not shown. The inlet port 50 is supplied with lubricating fluid under atmospheric pressure from a conduit 56 leading from a lubricant collecting pool maintained at a proper level in known manner and located at the bottom of the wet-sump type case 10 and the pump discharge port 52 is connected to a passage 58 in the end member 54 directed radially inwardly toward and connected to an annular groove in the member 54 adjacent the shaft 18 and sealed thereto as by a pair of O-ring seals 60, 62. The shaft 18 is set to rotate about the longitudinal axis thereof indicated at 64 and has a longitudinally drilled distribution conduit or passage 66 the axis of which is eccentrically located with respect to the shaft axis 64 in spaced apart parallelism thereto. The eccentrically mounted passage 66 is connected to the pressure pump outlet passage 58 by means of a radially drilled inwardly extending supply passage 68 formed in the shaft 18 and communicating with the stationary radial passage 58. In the closely spaced adjacency to the bell shaped portion 24 thereof, the shaft 18 has a shoulder 70 against which there is received the inner race 72 of a bearing assembly 74 comprising a plurality of ball bearing elements which are circumferentially spaced from one another in a cage 108 and engage the inner periphery of an outer race 76.

Through the medium of a soft snap ring 78 of shearable metal the outer race 76 of the ball bearing may be permanently locked in place within the radial flange 14 of the case 10. Adjacent the ball bearing 74 a sleeve 80 is provided which may be held in place as by a snap ring 82 and a key 84 so as to be rotatably and axially affixed to the shaft 18 and engage the inner bearing race 72. The sleeve 80 is formed with a set of external teeth 86 which engage a worm wheel type of speedometer gear 88 connected as by a flexible cable 90 to a vehicle speedometer and odometer instrument, not shown. The inwardly extending integral flange 14 on the case 10 has a forwardly and downwardly sloping passage 92 formed therethrough for conducting drainage from the bottom of the chamber 16 down into the bottom of the wet sump type case 10 at the location of the chamber 12.

The closure portion 22 of reduced diameter in the case 10 receives a sleeve bearing 94 which is press fitted therein and also a supplementary sleeve bearing 96 in a first annularly stepped counterbored portion within the interior thereof and additionally an oil seal 98 within a second annularly stepped further counterbored portion in the interior thereof. The sleeve bearing 94 and the ball bearing 74 journal the opposite ends of the tail shaft 18 for rotation about the axis 64 thereof, the relatively spaced apart ball elements of the latter providing relatively free and clear spaces between balls for the ready access and passage of lubricating fluid through the ball bearing, whereas the close fit and limited running clearance known to characterize sleeve bearings of the type indicated at 94, 96 offer only restrictive or limited passage of fluid between the metallic interfaces thereof.

The external splines 20 at the rear end of the tail shaft 18 are received in a companion set of internal splines formed in a universal joint sleeve 100 which by means of an orthodox universal connection 102 drives a propeller shaft 104 connected to the rear traction or drive wheels, not shown, for the vehicle. The universal joint sleeve 100 is piloted by the supplementary sleeve bearing 96 to rotate about the shaft axis 64 and the seal 98 concentric therewith prevents any substantial leakage of fluid from the case 10 through its closure end 22 of relatively reduced diameter. The universal joint sleeve 100 is closed at its rear end and provides a small clearance chamber 106 between the extremity of the tail shaft 18 and the bottom of the closure in the sleeve 100. The pressure fluid handled and circulated by the eccentrically mounted pump rotors 44, 46 is preferably a lubricant and in addition to its lubricating capacity may be further circulated and used to operate certain pressure actuated servo devices, not shown.

Passage means included in the pressure fluid circuit is provided for lubricating the relatively remote solid sleeve bearing 94 at the rear end of the case 10 and also for lubricating the ball bearing 74 and one-way clutch sprags 38 which in order to prevent bunching and to maintain their relative spaced apart relationship as between their individual elements are provided with spacer cages respectively indicated at 108 and 110.

Illustrative of one form of passage means for discriminately lubricating both the closely fitting remote bearings 94, 96 and ball bearing 74 is a first and a second radial passage internally formed in the shaft structure 18 and indicated respectively at 112 and 114. The first and second passages 112, 114 lead from the longitudinally extending internal eccentric passage 66 in the shaft 18 and are each disposed in the common plane of passage axis and the shaft axis 64 although they extend in diametrically opposite angular directions from one another. Thus the second passage 114 which lubricates the ball bearing 74 crosses the shaft axis 64 in its progress from the eccentric passage 66 to the periphery of the shaft 18 adjacent the shoulder 70 of the latter. On the other hand the first radial passage 112 for lubricating the close type sleeve bearing 94 extends directly radially outwardly to the closest circumferential point on the shaft 18 with respect to the eccentric passage 66, and communicates lubricant directly to the bearing 94. A portion of the lubricant received by the bearing 94 gradually progresses rearwardly and outwardly therefrom through the annular steps receiving the bearing 96 and the seal 98 so as to lubricate the additional bearing 96 but without loss of fluid through the rear end of the closure portion 22 of reduced diameter. The remainder of the lubricant passes in a film forwardly along the shaft 18 and enters the forwardly pitched drainage compartment 16 in the case 10. A plug 116 for a counterbore 118 within the bell shaped portion 24 of the shaft 18 is formed with a drilled clutch lubricating passage 120 of slightly restricted diameter which is diagonally related to the longitudinally extending axis of the eccentric passage 66 and which is intersected by the shaft axis 64 and disposed in the common plane of both named axes.

In operation, rotation of the unsupported center section of the shaft 18 between its rotatably mounted end portions causes the eccentrically mounted rotors 44, 46 of the rotary pump to withdraw fluid from the sump connected stationary conduit 56 in the case 10 and pressurize the same and introduce it into the stationary pump outlet and radial discharge passage 52, 58. The thus pressurized lubricating fluid is conducted inwardly through the stationary annular groove in the end wall 54 and through the series connected rotating passage 68, from which the fluid flows along the eccentric distribution conduit or passage 66. Regardless of the quantity of fluid at any one time in the passage 66, at least a portion present proceeds longitudinally rearwardly through the passage and is slung radially outwardly under centrifugal force through the short first passage 112 so as to insure lubrication of the close type bearing 94 and the supplementary bearing 96 at all times. Under normal conditions of supply, however, the eccentric passage 66 is maintained almost full of fluid and after pressure increases somewhat in the passage 66 due to continued action of the pump rotors 44, 46 the fluid is forced radially inwardly against the action of centrifugal force so as to proceed through the branch passage 114 and cross the shaft axis 64 and then be slung radially outwardly along the walls of the passage 114 and into the ball bearing 74 so as to lubricate the ball elements thereof. Fluid draining from the ball bearing elements is collected in the compartment 16 adjacent the bottom of the bearing unit containing the ball bearing elements and is conducted through the drain passage 92 into the bottom of the chamber 12 for recirculation by the pump. Simultaneously fluid under pressure is forced into the diagonally related relatively smaller passage 120 in the plug 116 and at a restricted rate is introduced into the interior of the bell shaped shaft end portion 24 so as to insure adequate lubrication for the one-way clutch elements 38 and also the planetary gearing which meshes with the ring gear teeth 28.

Illustrative of another example of passage means for lubricating the one-way clutch sprags 38 is the passage 220 according to Figure 4. In Figure 4 the tail shaft indicated at 218 has a bell shaped end portion 224 within which there is an upraised central boss 226. An eccentrically mounted distribution conduit or passage 266 formed within the shaft 218 extends through the boss 226 and is plugged as by a rivet shaped element 216. The plug 216 is disposed at one side of the central axis of rotation 264 for the shaft 218 and the clutch lubricating passage 220 is drilled through the boss 226 from a point at the opposite side of the axis 264. The passage 220 intersects with and crosses the shaft axis 264 so as to establish communication at 228 with the eccentric passage 266, the two named pasasges having their axes in a common plane containing the shaft axis 264. The distribution passage 266 is supplied with fluid as in the preceding embodiment from a pump supplied radial passage 268. In the embodiment of Figure 4 it will be noted that the clutch lubricating passage 220 is formed entirely separate from and is spaced apart from the end plug 216 for the eccentric longitudinally extending supply passage 266 in the tail shaft 218.

Illustrative of another example of passage means for lubricating the ball bearing is an anti-siphon or non-uniform passage 314 according to Figures 5 and 6. The anti-siphon passage 314 is disposed in the common plane of axes 364 and 365 of a tail shaft 318 and a longitudinally extending eccentric distribution conduit or passage 366 therein. An orifice 368 included at the inner end of the passage 314 forms an axially aligned but resistive path for receiving pressure fluid contained in the pump supplied eccentric passage 366, such that the initial column of fluid forced by pump pressure into the orificed mouth of the passage 314 has a relatively small diameter compared to the entire cross sectional area of the remaining portion of the passage 314. Accordingly the column of fluid leaving the restriction 368 tends to spread out along the walls of the remaining portion of the passage 314 without completely filling it and therefore leaves a void in the center of the remaining portion of such passage which will tend to prevent the formation and creation of any siphoning effect once the passage 314 is charged with fluid to the extent available. The orifice 368 as shown terminates at just about the exact point of intersection between the branch passage 314 and the longitudinal central axis of rotation of the shaft 318 indicated at 364.

Illustrative of another example of passage means for lubricating the close type remote bearing 94 is a two piece passage 414 formed in a continuous single drilling operation and divided by a conduit 466 as indicated in Figures 7 and 8. The mid-portion of the passage 414 is intersected by and divided by the longitudinally extending eccentric distribution conduit or passage 466 formed in a tail shaft 418 corresponding to the tail shafts of the preceding embodiments. The opposite end portions of the passage means 414 extend to the peripheral surface of the tail shaft 418 so as to lubricate a close type sleeve bearing 494 at two diametrically opposite points in a common transverse plane. The passage 414 is mutually perpendicular with respect to the eccentrically extending longitudinal passage 466 and is mutually perpendicular to the common plane of the passage axis and the longitudinal axis indicated at 464 for the shaft 418. The advantage of the shaft passage means 414 is that a pair of cross passages communicating with the longitudinal passage 414 may be provided with only one drilling operation and each passage leads from the passage 414 to the periphery of the shaft 418. At no point does the passage means 414 cross the shaft axis 464 and hence at no point is the fluid therein impeded by having to overcome centrifugal force and in fact is aided thereby at all points. In the embodiment of Figures 7 and 8 the points for lubricating the sleeve bearing 494 are in circumferential alignment with one another.

Illustrative of another form of passage means for lubricating the remote bearing 594 but wherein the points of lubrication are not circumferentially aligned is the passage means 514 according to the embodiment of Figures 9 and 10. The passage means 514 is formed by one continuous drilling operation at a diagonal angle and intersects a longitudinally extending eccentrically mounted distribution conduit or passage 566 formed in a transmission tail shaft 518 which corresponds to the tail shaft of the preceding embodiments. The passage 514 is diagonally related to the plane of the axis of the eccentric passage 566 and a central axis 564 for the shaft 566 and at its mid-portion diagonally intersects the eccentric passage 566 at the point of intersection with such plane. The opposite end portions of the passage means 514 lubricate a close type remote bearing 594 at a pair of axially spaced apart locations 596, 598. The term "eccentric" as applied to the passage 566 refers to its offset with respect to the shaft axis 564 which coincides with the axis of shaft rotation.

Illustrative of another form of eccentrically mounted passage for the transmission shaft is a distribution conduit or passage 666 according to Figures 11 and 12. The distributing passage 666 is relatively oversize in its diametrical dimension as compared to the eccentrically mounted longitudinal passages of the preceding embodiments and includes therewithin the longitudinal rotational axis 644 of the tail shaft 618. The distribution passage 666 has its own axis 668 which is parallel to but spaced apart from the mutually coincident central shaft axis and shaft axis of rotation jointly indicated at 644. The shaft 618 has a first and a second set of one or more branch passages which are indicated at 612 and 614 respectively. The set of first passages 612 which as shown are three in number extend radially outwardly in the common plane of the axes 644, 668 to the closest points on the periphery of the tail shaft 618 adjacent a set of sleeve bearings 694, 696. The set of one or more second passages 614, preferably being and actually shown to consist of only one in number due to axial limitations of a single bearing 674 shown extends in the noted common plane in an opposite angular direction from the passage 612 so as to be just short of being intersected by and crossing the shaft axis 644 in its progress toward the outer periphery of the tail shaft 618 for directly lubricating the ball bearing 674.

In the operation of the embodiment of Figures 11 and 12 any minor quantities of fluid in the enlarged eccentric passage 666 will be centrifugally slung toward and tend to cling to the side thereof opposite to the shaft axis 644 and be fed in continuous communication to the close type sleeve bearings 694 and 696. When adequate quantities of pump supplied fluid are available to fill the eccentric passage 666 then the fluid will be forced radially outwardly through the second passage 614 so as to be slung out and caused to lubricate the ball bearings 674 without permitting an undue escape of fluid and allow the close bearings 694, 696 to run dry. The first set of passages 612 will be noted to be three in number for providing well distributed lubrication points for the bearing sleeve 694 particularly at the end thereof adjacent the additional bearing 696 as well as at axially spaced apart other locations.

As herein disclosed the modifications of the invention according to Figures 4, 5, 7, 8, 9 and 11 are shown in separate relationship from one another and from the principal embodiment of Figure 1. It is evident that these modifications may be individually substituted for their counterparts in Figure 1 or else used with one another in combinations analogous to the showing of Figure 1. The lubricant requiring devices comprising the one-way clutch sprags 38, and ball bearing 74 having circumferentially spaced apart respective sprags and elements according to Figures 1, 4, 5 and 12 among others, are described in terms of having a frictionally engaging one-way clutch function or else a function as an anti-friction bearing as appropriate, but self-evidently a one-way brake either in association with or adjacent the central shafting may be lubricating to the same advantage as shown for the one-way clutch and for the anti-friction bearings and ony oneway or free wheeling brake in association with the shafting may be similarly lubricated in certain installations. The lubricated bearings according to the embodiments herein appearing are directly associated with the shafting in question and the ball bearings associated with the shafting are seen to be particularly served only by restricted or unrestricted directly transverse or normal branches. But indeed it is not essential to the invention that the diagonal and that the directly transverse passages be associated only with a specific lubricated device directly cooperating with the shaft and the relatively restricted or unrestricted passages selected and the relative angular relationships thereof may be appropriately fitted to the installation desired and may be used with devices both directly and indirectly associated with the particular shafting wherein the passages are located.

Variations within the spirit and scope of the invention described are equally comprehended by the foregoing description.

What is claimed is:

1. A longitudinally extending shaft having a mid-portion and journal portions at the opposite ends adapted to be set in bearings for mounting the shaft for rotation about a first axis, a longitudinally extending conduit in the shaft having a second axis disposed in spaced apart parallelism to the first axis, a lubricating passage in the common plane of the first and second axes and intersected by the first axis, said passage being disposed in one end of the shaft and establishing communication between the conduit and an outside point on the journal portion at that end of the conduit, and a lubricating passage disposed at the other end of the shaft in the common plane of the first and second axes and communicatively connecting the conduit and the closest outside point on the journal portion at the corresponding end.

2. A longitudinally extending shaft having a mid-portion and journal portions at the opposite ends adapted to be set in bearings for mounting the shaft for rotation about a longitudinal axis, a longitudinally extending conduit in the shaft disposed in spaced apart parallelism to the axis of shaft rotation, a bearing lubricating passage in the common plane of the conduit and the axis of shaft rotation and intersected by said axis, said passage being disposed in one end of the shaft and establishing communication between the conduit and an outside point on the journal portion at that end of the conduit, and a bearing lubricating passage disposed at the other end of the shaft in the common plane of the conduit and said axis and communicatively connecting the conduit and the closest outside point on the journal portion at the corresponding end for lubricating the same.

3. A longitudinally extending shaft having a mid-portion and journal portions at the opposite ends adapted to be set in bearings for mounting the shaft for rotation about the longitudinal axis thereof, said shaft further having a longitudinally extending conduit through which the shaft axis passes, said conduit having its own axis disposed in spaced apart parallelism to the axis of the shaft, a lubricating passage in the common plane of the conduit and shaft axes and intersected by the latter axis, said passage being disposed in one end of the shaft and establishing communication between the conduit and an outside point on the journal portion at that end of the conduit, and a lubricating passage disposed at the other end of the shaft in the common plane of he conduit and shaft axes and communicatively connecting the conduit and the closest outside point on the journal portion at the corresponding end.

4. A longitudinally extending shaft having a mid-portion and portions at the opposite ends at least one of which is adapted to be set in a bearing for mounting the shaft for rotation about a first longitudinal axis, a clutch associated with said shaft, a longitudinally extending conduit in the shaft having a second axis disposed in spaced apart parallelism to the first axis, a clutch lubricating passage in the common plane of the first and second axes and intersected by the first axis, said passage being disposed in one end of the shaft and establishing communication between the conduit and a point on the shaft portion at that end of the conduit, and a bearing lubricating passage disposed at the other end of the shaft in the common plane of the conduit and shaft axes and communicatively connecting the conduit and the closest outside point on the journal portion at the corresponding end for lubricating the same.

5. A longitudinally extending shaft having a mid-portion and portions at the opposite ends at least one of which is adapted to be set in a bearing for mounting the shaft for rotation about the longitudinal axis thereof, a longitudinally extending conduit in the shaft having an axis disposed in spaced apart parallelism to the axis of the shaft, a first lubricating passage in the common plane of the conduit and shaft axes and extending in a direction so as to be intersected by the latter axis, said first passage being disposed in one end of the shaft and establishing communication between the conduit and an outside point on the shaft portion at that end of the conduit, and a second lubricating passage disposed at the other end of the shaft and extending in a different direction from the first passage, said second passage communicatively connecting the conduit and an outside point on the shaft portion at the corresponding end for lubricating the same.

6. A longitudinally extending shaft having a mid-portion and portions at the opposite ends at least one of which is adapted to be set in a bearing for mounting the shaft for rotation about the longitudinal axis thereof, a longitudinally extending conduit in the shaft having an axis disposed in spaced apart parallelism to the axis of the shaft, a first lubricating passage in the common plane of the conduit and shaft axes and extending in a direction so as to be intersected by the latter axis, said first passage being disposed in one end of the shaft and establishing communication between the conduit and an outside point on the periphery of the shaft portion at that end of the conduit, and a second lubricating passage disposed at the other end of the shaft and extending in a different direction from the first passage, said second passage communicatively connecting the conduit and an outside point on the shaft portion at the corresponding end for lubricating the same.

7. A longitudinally extending shaft having a mid-portion and portions at the opposite ends at least one of which is adapted to be set in a bearing for mounting the shaft for rotation about the longitudinal axis thereof, a clutch associated with said shaft, a longitudinally extending conduit in the shaft having an axis disposed in spaced apart parallelism to the axis of the shaft, a first clutch lubricating passage in the common plane of the conduit and shaft axes and extending in a direction so as to be intersected by the latter axis, said first passage being disposed in one end of the shaft and establishing communication between the conduit and an outside point on the shaft portion at that end of the conduit, and a second lubricating passage disposed at the other end of the shaft and extending in a different direction from the first passage, said second passage communicatively connecting the conduit and an outside point on the shaft portion at the corresponding end for lubricating the same.

8. A longitudinally extending shaft having a mid-portion and portions at the opposite ends at least one of which is adapted to be set in a bearing for mounting the shaft for rotation about the longitudinal axis thereof, a longitudinally extending conduit in the shaft spaced apart from the axis of the shaft and having its own axis parallel to the same, a first lubricating passage in the common plane of the conduit and shaft axes and extending in a direction so as to be intersected by the latter axis, said first passage being disposed in one end of the shaft and establishing communication between the conduit and an outside point on the shaft portion at that end of the conduit, and a second lubricating passage disposed at the other end of the shaft and extending in a different direction from the first passage, said second passage communicatively connecting the conduit and an outside point on the shaft portion at the corresponding end for lubricating the same.

9. A longitudinally extending shaft having a mid-portion and portions at the opposite ends at least one of which is adapted to be set in a bearing for mounting the shaft for rotation about the longitudinal axis thereof, a longitudinally extending conduit in the shaft having an axis disposed in spaced apart parallelism to the axis of the shaft, a first lubricating passage in the common plane of the conduit and shaft axes and extending in a direction so as to be intersected by the latter axis, said first passage being of non-uniform cross section and disposed in one end of the shaft and establishing communication between the conduit and an outside point on the shaft portion at that end of the conduit, and a second lubricating passage disposed at the other end of the shaft and extending in a different direction from the first passage, said second passage communicatively connecting the conduit and an outside point on the shaft portion at the corresponding end for lubricating the same.

10. A longitudinally extending shaft having a mid-portion and portions at the opposite ends at least one of which is adapted to be set in a bearing for mounting the shaft for rotation about the longitudinal axis thereof, a longitudinally extending cinduit in the shaft having an axis disposed in spaced apart parallelism to the axis of the shaft, a first lubricating passage in the common plane of the conduit and shaft axes and extending in a direction so as to be intersected by the latter axis, said first passage being of uniform cross section and disposed in one end of the shaft and establishing communication between the conduit and an outside point on the shaft portion at that end of the conduit, and a second lubricating passage disposed at the other end of the shaft and extending in a different direction from the first passage, said second passage communicatively connecting the conduit and an outside point on the shaft portion at the corresponding end for lubricating the same.

11. A longitudinally extending shaft having at least one end portion adapted to be set in a bearing for mounting the shaft for rotation about the longitudinal axis thereof, an eccentrically located fluid conduit formed longitudinally in the shaft having an axis disposed in spaced apart parallelism to the axis of the shaft, first fluid passage means in the common plane of the conduit and shaft axes and extending in a direction so as to be intersected by the latter axis, said first passage means being disposed in one end of the shaft and establishing communication between the conduit and an external point on the shaft portion at that end of the conduit, and second fluid passage means disposed at the other end of the shaft and extending in a different direction from the first passage means and communicatively connecting the conduit and an external point on the shaft portion at the corresponding end, whereby fluid impelling centrifugal forces effective in the eccentrically located fluid conduit intending to cause conduit contained fluid to be slung into and traverse the second passage means, but tending to oppose introduction of the conduit-contained fluid into the first passage means.

12. A longitudinally extending shaft having at least one end portion adapted to be set in a bearing for mounting the shaft for rotation about the longitudinal axis thereof, an eccentrically located fluid conduit formed longitudinally in the shaft having an axis disposed in spaced apart parallelism to the axis of the shaft, first fluid passage means in the common plane of the conduit and shaft axes and extending in a direction so as to be intersected by the latter axis, said first passage means being disposed in one end of the shaft and establishing communication between the conduit and an external point on the shaft portion at that end of the conduit, and a second fluid passage means disposed at the other end of the shaft and extending in an opposite direction from the first fluid passage means and communicatively connecting the conduit and an external point on the shaft portion at the corresponding end, whereby fluid impelling centrifugal forces effective in the eccentrically located fluid conduit intending to cause conduit contained fluid to be slung into and traverse the second passage means, but tending to oppose introduction of the conduit-contained fluid into the first passage means.

13. In combination, a case supported bearing, a shaft having a relatively remote end set to rotate in the bearing, said shaft further having a first longitudinally extending axis about which the aforementioned rotation takes place and having an eccentric longitudinal conduit defining a second axis parallel to the first, a pressure fluid pump at the relatively near end of the shaft and driven thereby to supply pressure fluid to the eccentric conduit, a plurality of elements requiring lubrication and defining a circumferential path of revolution in the vicinity of the near end of the shaft and mechanically cooperating with the latter, and a passage connected to the conduit at each end of the shaft, the passage at the remote end extending in a predetermined generally radially outward direction with respect to the first axis to communicate pressure fluid at all times to the remote bearing, the passage at the rear end of the shaft being on an opposite side of and extending in a different direction from the other passage with respect to the first axis to lubricate the plurality of elements aforesaid whenever excess fluid over the amount required by the remote bearing is available.

14. In combination, a case supported bearing, a shaft having a relatively remote end set to rotate in the bearing, said shaft containing a first longitudinal axis about which it rotates and an eccentric longitudinal conduit defining a second axis parallel to the first, a pressure fluid pump at a relatively near section of the shaft and driven thereby to supply pressure fluid to the eccentric conduit, a plurality of elements requiring lubrication and defining a circumferential path of revolution in the vicinity of the near section of the shaft and mechanically cooperating with the latter, a near and a remote passage connected to the conduit, the remote passage extending in a predetermined radially outward direction with respect to the second axis to communicate pressure fluid at all times to the remote bearing, the near passage extending in a different direction from the remote passage with respect to the second axis and conduit to lubricate the plurality of elements aforesaid whenever excess fluid over the amount required by the remote bearing is available.

15. Rotatable shaft structure having a reference axis of rotation, a plurality of generally transverse internal branch passages terminating at different spaced apart external points on the shaft structure and each passage leading from inside the shaft to the shaft exterior and in a different direction from the other passage, and a circularly sectioned distribution conduit formed in the shaft structure eccentrically with respect to the axis of rotation and intersecting each of the branch passages at a differing radial distance from the point of intersection of the other passage with respect to the reference axis of rotation whereby the centrifugal force exerted on a body within the distribution conduit will be different in the area of one point of intersection as compared to the area of the other point of intersection.

16. Rotatable shaft structure having a reference axis of rotation, a plurality of generally transverse internal branch passages terminating at different spaced apart external points on the shaft structure and each passage leading from inside the shaft to the shaft exterior and in a different direction from the other passage, and a circularly sectioned distribution conduit formed in the shaft structure eccentrically with respect to the axis of rotation and intersecting each of the branch passages at a differing radial distance from the point of intersection of the other passage with respect to the reference axis of rotation whereby the centrifugal forces exerted on a fluid body within the distribution conduit will be algebraically opposite to one another in the area of one point of intersection as compared to the area of the other point of intersection.

17. Rotatable shaft structure having a reference axis of rotation, a plurality of generally transverse internal branch passages terminating at different spaced apart external points on the periphery of the shaft structure and each passage leading from inside the shaft to the shaft exterior and in a different direction from the other passage, and a longitudinally extending distribution conduit formed in a shaft structure eccentrically with respect to the axis of rotation and intersecting each of the branch passages at a different radial distance from the point of intersection of the other passage with respect to the reference axis of rotation whereby the centrifugal force exerted on a body within the distribution conduit will be different in the area of one point of intersection as compared to the area of the other point of intersection.

18. Rotatable shaft structure having a reference axis of rotation, a plurality of generally transverse internal branch passages terminating at different spaced apart external points on the shaft structure and each passage being of a uniform cross section and leading from inside the shaft to the shaft exterior and in a different direction from the other passage, and a circularly sectioned distribution conduit formed in the shaft structure eccentrically with respect to the axis of rotation and intersecting each of the branch passages at a differing radial distance from the point of intersection of the other passage with respect to the reference axis of rotation whereby the centrifugal force exerted on a contained medium within the distribution conduit will be different in the area of one point of intersection as compared to the area of the other point of intersection.

19. Rotatable shaft structure having a reference axis of rotation, a plurality of generally transverse internal branch passages terminating at different spaced apart external points on the shaft structure one of which is at a terminal of the shaft structure and each passage leading from inside the shaft to the shaft exterior and in a different direction from the other passage, and a circularly sectioned distribution conduit formed in the shaft structure eccentrically with respect to the axis of rotation and intersecting each of the branch passages at a differing radial distance from the point of intersection from the other passages with respect to the reference axis of rotation whereby the centrifugal force exerted on a body within the distribution conduit will be different in the area of one point of intersection as compared to the area of the other point of intersection.

20. Rotatable shaft structure having a reference axis of rotation, a plurality of generally diagonally transverse internal branch passages terminating at different spaced apart external points on the shaft structure and each passage leading from inside the shaft to the shaft exterior and in a different direction from the other passage, and a longitudinally extending distrbution conduit formed in the shaft structure eccentrically with respect to the axis of rotation and intersecting each of the branch passages at a differing radial distance from the point of intersection of the other passage with respect to the reference axis of rotation whereby the centrifugal force exerted on a fluid within the distribution conduit will be different in the area of one point of intersection as compared to the area of the other point of intersection.

21. Rotatable shaft structure having a reference axis of rotation, two generally transverse internal branch passages terminating at different spaced apart external points on the shaft structure and each passage leading from inside the shaft to the shaft exterior and in a different direction from the other passage, and a circularly sectioned distribution conduit formed in the shaft structure eccentrically with respect to the axis of rotation and normal to and intersecting each of the branch passages at a differing radial distance from the point of intersection of the other passage with respect to the reference axis of rotation whereby the centrifugal force exerted on a body within the distribution conduit will be different in the area of one point of intersection as compared to the area of the other point of intersection.

22. In combination with a shaft having an axis of rotation, an eccentric longitudinal conduit formed in the shaft for conducting lubricating fluid and defining a second axis parallel to said rotational axis, first and second spaced apart devices through which the rotational axis passes, said second device incorporating a circumferential row of spaced apart elements requiring lubrication and defining a path of revolution, and a generally transverse passage in the shaft connected to the conduit adjacent each device, the passage adjacent the first device extending in a predetermined diagonally radially outward direction to communicate lubricating fluid at all times thereto, the passage adjacent the second device extending in a different diagonally radially outward direction from the other passage with respect to the conduit to lubricate the circumferential row of spaced apart elements aforesaid whenever excess lubricating fluid over the amount required by the first device is available.

23. In combination, a case supported bearing, a shaft having a relatively remote end set to rotate in the bearing, said shaft further having a first longitudinal axis about which it rotates and having an eccentric longitudinal conduit defining a second axis parallel to the first, a pressure fluid pump at the relatively near end of the shaft and driven thereby to supply pressure fluid to the eccentric conduit, a plurality of frictionally engageable elements requiring lubrication and defining a circumferential path of revolution in the vicinity of the near end of the shaft and engageable with the latter, and a passage connected to the conduit at each end of the shaft, the passage at the remote end extending in a predetermined generally radially outward direction to communicate pressure fluid at all times to the remote bearing, the passage at the near end of the shaft extending in a different direction from the other passage with respect to the conduit to lubricate the plurality of frictionally engageable elements aforesaid whenever excess fluid over the amount required by the remote bearing is available.

24. In combination, a case supported sleeve bearing, a shaft having a relatively remote end set to rotate in the bearing, said shaft further having a first longitudinal axis about which it rotates and having an eccentric longitudinal conduit defining a second axis parallel to the first, a pressure fluid pump at the relatively near end of the shaft and driven thereby to supply pressure fluid to the eccentric conduit, a plurality of anti-friction elements requiring lubrication and defining a circumferential path of revolution in the vicinity of the near end of the shaft and mechanically cooperating with the latter, and a passage connected to the conduit at each end of the shaft, the passage at the remote end extending in a predetermined generally radially outward direction to communicate pressure fluid at all times to the remote sleeve bearing, the passage at the near end of the shaft extending in a different direction from the other passage with respect to the conduit to lubricate the plurality of anti-friction elements aforesaid whenever excess fluid over the amount required by the remote sleeve bearing is available.

25. In combination, a case supported bearing, a shaft having a relatively remote end set to rotate in the bearing, said shaft further having a first longitudinal axis about which it rotates and having an eccentric longitudinal conduit adapted to conduct fluid and being spaced apart from and defining a second axis parallel to the first, a plurality of one-way clutch elements requiring lubrication and defining a circumferential path of revolution in the vicinity of the near end of the shaft and mechanically cooperating with the latter, and a passage connected to the conduit at each end of the shaft, the passage at the remote end extending in a predetermined radially outward direction to communicate pressure fluid at all times to the remote bearing, the passage at the near end of the shaft extending in a different direction from the other passage with respect to the conduit to lubricate the plurality of one-way clutch elements aforesaid whenever excess fluid over the amount required by the remote bearing is available.

26. In combination, a case supported bearing, a shaft having a relatively remote end set to rotate in the bearing, said shaft further having a first longitudinal axis about which it rotates and having an eccentric longitudinal conduit defining a second axis parallel to the first, a pressure fluid pump at the relatively near end of the shaft and driven thereby to supply pressure fluid to the eccentric conduit, a plurality of anti-friction elements requiring lubrication and defining a circumferential path of revolution in the vicinity of the near end of the shaft and rotatably supporting the same, and a passage connected to the conduit at each end of the shaft, the passage at the remote end extending in a predetermined radially outward direction to communicate pressure fluid at all times to the remote bearing, the passage at the near end of the shaft extending in a different direction from the other passage with respect to the conduit to lubricate the plurality of anti-friction elements aforesaid whenever excess fluid over the amount required by the remote bearing is available.

27. A longitudinally extending shaft having a mid portion and journal portions at the opposite ends adapted to be set in bearings for mounting the shaft for rotation about a longitudinal axis, a longitudinally extending conduit in the shaft disposed in spaced apart parallelism to the axis of shaft rotation, a bearing lubricating passage in the common plane of the conduit and the axis of shaft rotation and intersected by said axis, said passage being disposed in one end of the shaft and establishing communication between the conduit and an outside point on the journal portion at that end of the conduit, and a bearing lubricating passage disposed at the other end of the shaft perpendicularly to the common plane of the conduit and said axis and communicatively connecting the conduit and an outside point on the journal portion of the corresponding end for lubricating the same.

28. A longitudinally extending shaft having a mid-portion and portions at the opposite ends at least one of which is adapted to be set in a bearing for mounting the shaft for rotation about a first longitudinal axis, a clutch associated with said shaft, a longitudinally extending conduit in the shaft having a second axis disposed in spaced apart parallelism to the first axis, a clutch lubricating passage in the common plane of the first and second axes and intersected by the first axis, said passage being disposed in one end of the shaft and establishing communication between the conduit and a point on the shaft portion at that end of the conduit, and a bearing lubricating passage disposed at the other end of the shaft in diagonal relationship to the common plane of the conduit and shaft axes and communicatively connecting the conduit and an outside point on the journal portion at the corresponding end for lubricating the same.

References Cited in the file of this patent

UNITED STATES PATENTS

| 1,988,440 | Cotterman | Jan. 22, 1935 |
| 2,125,645 | Money | Aug. 2, 1938 |
| 2,492,831 | Banker | Dec. 27, 1949 |

FOREIGN PATENTS

| 356,472 | Great Britain | Sept. 10, 1931 |
| 610,010 | Great Britain | Oct. 11, 1948 |